United States Patent
Dutton et al.

[11] Patent Number: 6,003,937
[45] Date of Patent: Dec. 21, 1999

[54] SAFETY SEAT

[75] Inventors: Alan James Dutton, North Yorkshire; Dusan Kecman, Bedfordshire, both of United Kingdom

[73] Assignee: Henlys Group PLC, United Kingdom

[21] Appl. No.: 09/077,720
[22] PCT Filed: Dec. 2, 1996
[86] PCT No.: PCT/GB96/02968
    § 371 Date: Sep. 8, 1998
    § 102(e) Date: Sep. 8, 1998
[87] PCT Pub. No.: WO97/20707
    PCT Pub. Date: Jun. 12, 1997

[30] Foreign Application Priority Data

Dec. 7, 1995 [GB] United Kingdom ............. 9525033

[51] Int. Cl.⁶ .................. B60N 2/42; B60R 21/00
[52] U.S. Cl. .................. 297/216.1; 297/216.13; 297/452.29; 297/452.61; 297/248
[58] Field of Search .................. 297/452.55, 216.1, 297/216.12, 216.13, 216.14, 440.2, 452.18, 452.29, 452.61, 248

[56] References Cited

U.S. PATENT DOCUMENTS

| | | |
|---|---|---|
| 2,867,266 | 1/1959 | Vogler . |
| 3,337,260 | 8/1967 | Proctor ........................... 297/216.1 X |
| 3,627,379 | 12/1971 | Faust ............................ 297/216.13 X |
| 4,076,306 | 2/1978 | Satzinger ........................ 297/216.13 |
| 4,192,545 | 3/1980 | Higuchi et al. .................. 297/216.13 |
| 4,615,561 | 10/1986 | Nomura .......................... 297/452.29 X |
| 4,796,954 | 1/1989 | Saito ............................ 297/452.29 X |
| 5,219,202 | 6/1993 | Rink et al. ..................... 297/216.13 |
| 5,251,963 | 10/1993 | Inayoshi et al. ................. 297/452.29 |
| 5,269,590 | 12/1993 | Carilli .......................... 297/216.1 X |
| 5,292,177 | 3/1994 | Balderi et al. ................... 297/248 X |
| 5,468,053 | 11/1995 | Thompson et al. ................ 297/452.18 X |
| 5,470,128 | 11/1995 | Kerkham ......................... 297/248 X |
| 5,507,555 | 4/1996 | Kiguchi ......................... 297/216.14 |
| 5,542,747 | 8/1996 | Burchi .......................... 297/452.55 |
| 5,597,139 | 1/1997 | Beroth .......................... 297/248 X |
| 5,609,395 | 3/1997 | Burch ........................... 297/452.55 |
| 5,676,423 | 10/1997 | Pedronno et al. ................. 297/452.18 X |
| 5,769,360 | 1/1998 | Kerbis .......................... 297/248 X |
| 5,829,836 | 11/1998 | Schumacher et al. .............. 297/248 X |
| 5,882,072 | 3/1999 | Morlock ......................... 297/216.13 |

FOREIGN PATENT DOCUMENTS

| | | | |
|---|---|---|---|
| 2120277 | 12/1970 | France . | |
| 2225316 | 4/1979 | France . | |
| 3729392 C1 | 3/1987 | Germany . | |
| 2083347 | 3/1982 | United Kingdom . | |
| 2167291 | 5/1986 | United Kingdom .............. 297/452.18 |

*Primary Examiner*—Milton Nelson, Jr.
*Assistant Examiner*—Rodney B. White
*Attorney, Agent, or Firm*—Factor and Shaftal

[57] ABSTRACT

A safety seat for use in passenger transport and advantageously provides sufficient strength to withstand maximum loading during collision. The seat comprises a rear portion comprising a plurality of sections having different relatively controllable deformable and/or collapsible properties and suitable energy absorbing capacity so that during collision an individual seated rearwardly of the seat is protected. Additionally the safety seat suitably restrains a seated individual during collision. The safety seat therefore provides a safety seat and frame which is adapted to accommodate maximum load, which load is provided when an individual seated therein is thrown forwardly within a restraining device such as a seat belt and when an individual seated rearwardly thereof is thrown against same.

11 Claims, 4 Drawing Sheets

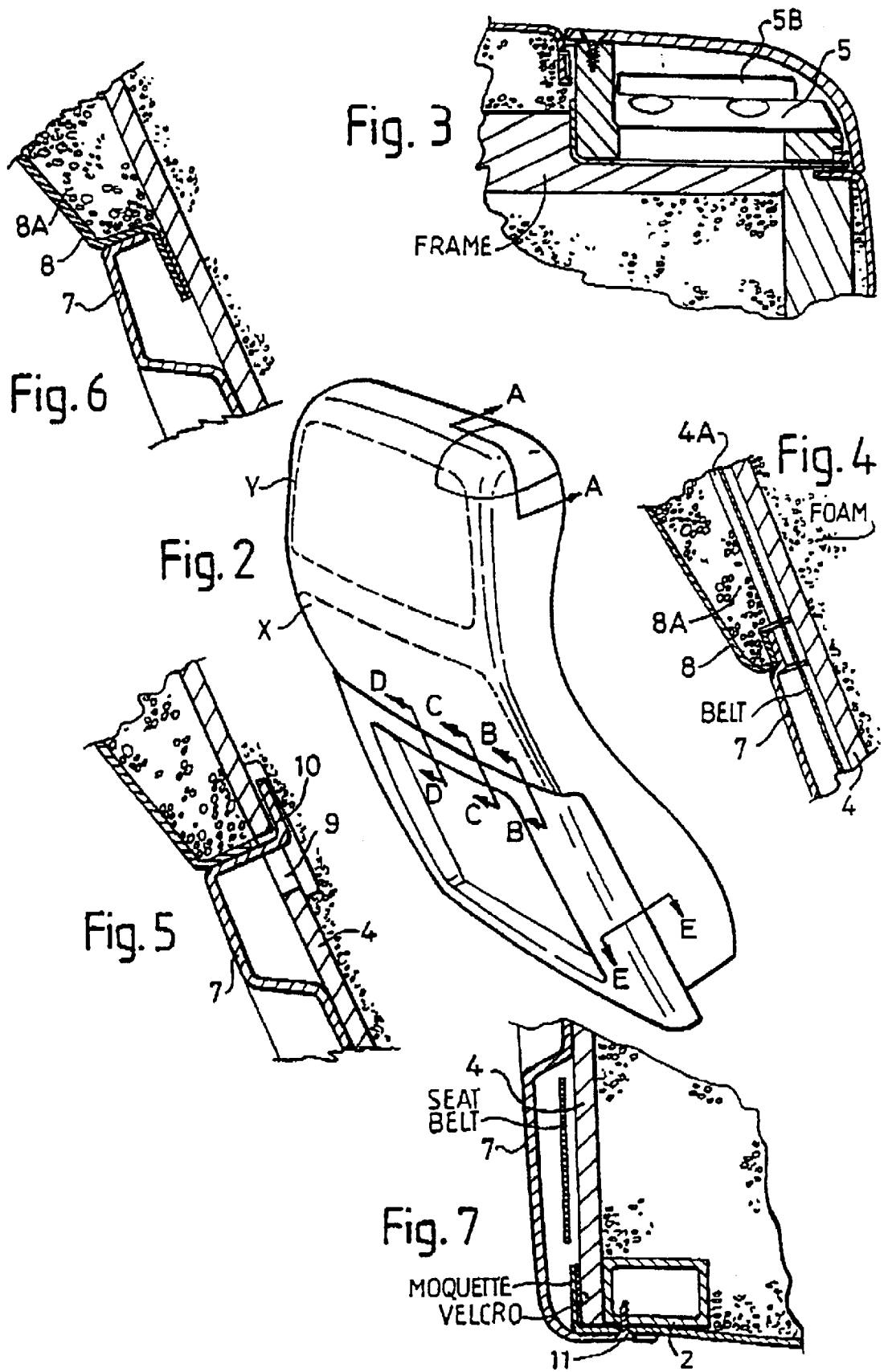

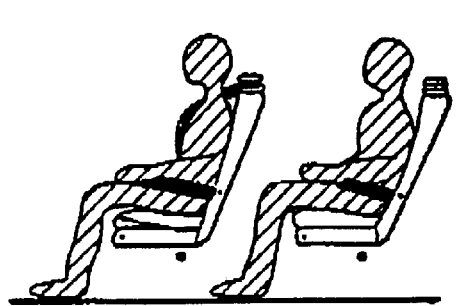
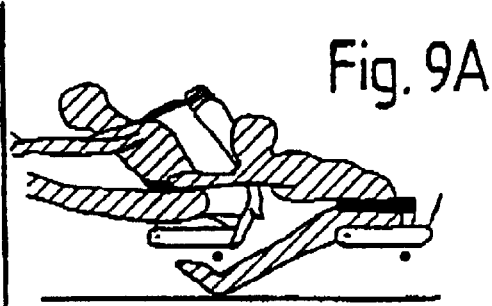
Fig. 9A
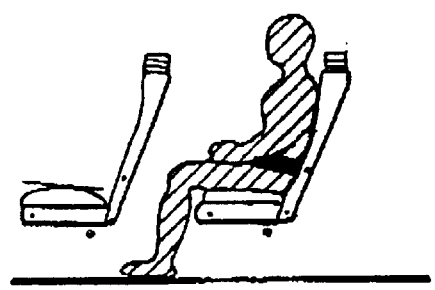
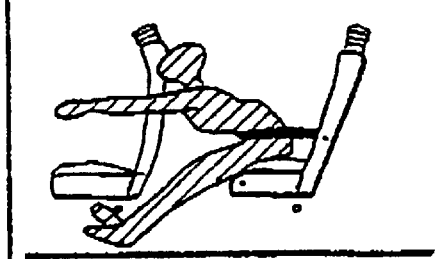
Fig. 9B
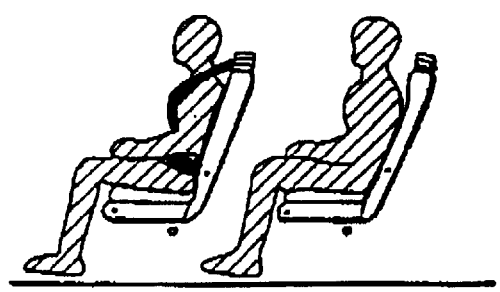
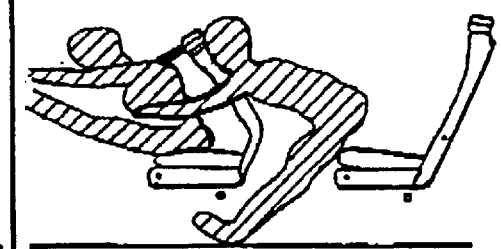
Fig. 9C
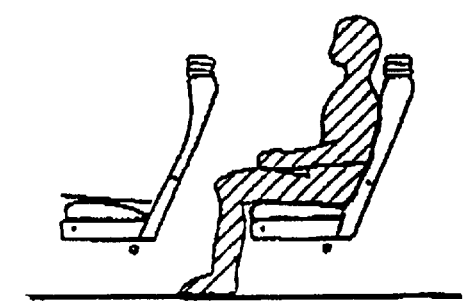
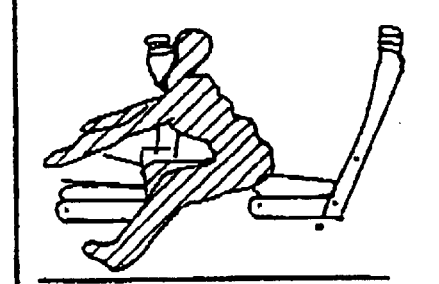
Fig. 9D

SAFETY SEAT

FIELD OF THE INVENTION

The invention relates to a safety seat for use in a passenger transport compartment particularly, but not exclusively, a compartment such as that found in a vehicle, train or plane.

BACKGROUND OF THE INVENTION

Vehicles, trains and planes are equipped with seats in which passengers can travel harnessed/belted or unharnessed/unbelted during at least a part of a journey. These seats are typically provided with a number of safety features which are designed to reduce injury to a seated individual when the vehicle, train or plane, hereinafter referred to as the transportation mode, either makes a sudden change in speed and/or is involved in a collision. For example, it is known to equip such seats with safety belts. The safety belts are provided generally in one of two forms, firstly there is a lap belt which is characterised by having 2-points of attachment and a single strap which is arranged so as to pass across the pelvis of a seated individual; secondly, there is a 3-point safety belt which is characterised by having 3-points of attachment and a strap which is arranged to pass across the torso of a seated individual as well as across the pelvis.

It is known that where a transportation mode has to brake suddenly or is involved in a collision, individuals are typically thrown forward within their seats. The aforementioned safety belts serve to limit this forward movement and so effectively restrain an individual in a given seat. The effectiveness of this restraint is determined by the nature of the safety belt system (system is defined as the integration as a whole of the seat belt, its anchorage point, the integration of the anchorage to the seat structure, and finally, the attachment of the seat assembly to the transport mode structure). For example, in a extreme situation where an individual is not wearing a safety belt, during deceleration, the individual is blown to be thrown forward and the knees of such an individual make contact with the lower rear part of a forward seat and then the upper torso/head of such an individual makes contact with the upper rear part of the same seat. In the instance where a lap belt is used, when the individual is thrown forward, the knees of the individual go forward to a lesser extent, compared to that of an unbelted individual, but the upper torso/head of such an individual is thrown rearward and then thrown forward with a considerable rotational force often resulting in a condition known as whiplash. In the instance where an individual is wearing a 3-point seat belt the amount of forward movement of the upper and lower part of the body is considerably reduced by the restraining effect of the seat belt system and thus the amount of damage to such an individual is minimised.

In addition, in so far as vehicles are concerned they are classified within the European Community System according to their seating capacity and general size. For example, M1 type vehicles are vehicles with less than 8 seats plus the driver. These would normally be cars weighing between 1 and 2 tonnes and in these vehicles the lap belt test load is 22,250±200 Newton×20 g.

M2 vehicles are vehicles with more than 8 seats plus the driver and having a maximum weight of less than 5 tonnes. The lap belt test load for these vehicles is 11,100±200 Newton×10 g. This would normally be a van derived mini-bus weighing 2.5 to 5 tonnes.

A M3 type vehicles is a vehicle with more than 8 seats plus driver and weighing more than 5 tonnes. The lap belt test load for these vehicles is 7,400±200 Newton×6.6 g.

It can therefore be seen that the lap belt test load increases as the size of the vehicle decreases. This is because, as the weight of the vehicle decreases the deceleration rate increases and thus the force with which an individual is thrown forward increases.

It therefore follows that the structural characteristics of a seat determine not only whether an individual can be sufficiently restrained in a given safety belt during impact but also the extent to which an individual in a rear-most seat will be damaged following impact with the rear of a foremost seat.

We have conducted investigations in order to determine the most desirable properties of a safety seat with a view to ensuring that a seated individual is suitably restrained using a safety belt during impact and that a rearward individual colliding with the rear of the seat suffers minimal damage or at least recommended levels of injury criteria are met.

Recommended levels of injury are as defined in United Nations document ECE R80 Annex 7 at a seat pitch of 750 mm and a sled pulse of 12 g. These being:

(HAC) HEAD ACCEPTABILITY CRITERION less than 500 as per Section 5.2.2.1.1.

(ThAC) THORAX ACCEPTABILITY CRITERION less than 30 g for up to 3 ms as per Section 5.2.2.1.2.

(FAC) FEMUR ACCEPTABILITY CRITERION less than 10 KN(8 KN for more than 20 nms) as per Section 5.2.2.1.3.

We have therefore endeavoured to provide a safety seat which can absorb dynamic energy and which can absorb resistance to applied loading.

Our safety seats have essentially 3 functions. Firstly, the seat is sufficiently strong to withstand maximum loading which is typically applied to such a seat during a collision. Secondly, it has deformable and/or collapsible properties during collision and, thirdly, it has suitable energy absorbing capacity during collision so as to protect an individual seated rearward of same.

It is therefore an object of the invention to provide a safety seat which minimizes damage to an individual seated rearward thereof during collision.

It is a further object of the invention to provide a safety seat which suitably restrains a seated individual during collision.

It is a further object of the invention to provide a safety seat which undergoes deformation and/or collapse in a relatively controlled fashion during collision.

SUMMARY OF THE INVENTION

According to a first aspect of the invention there is therefore provided a safety seat for use in a transport compartment comprising a seat frame adapted to have a restraining means attached there to; a front member also attached to said frame and adapted for a user's comfort; and a rear member also attached to said frame and further divided into at least 3 further parts; an upper part including an energy absorbing structure which is adapted to absorb up to 7000 NM of energy during impact; a middle part and a lower part including an energy absorbing structure adapted to absorb no more than 2,900 NM of energy during impact.

In a preferred embodiment said middle part comprises an energy absorbing structure adapted to absorb up to 16,000 NM of energy during impact.

In a preferred embodiment of the invention the upper part absorbs up to 6,900 NM and ideally 6,901.5 NM of energy;

the middle part absorbs up to 15,800 NM and ideally 15,818.8 NM; and the lower part absorbs no more than 2,900 NM and ideally 2,975.3 NM.

It will be apparent from the above that the upper part of the rear member of the seat is provided wit significant energy absorbing characteristics because in instances of impact, especially where a lap seat belt is worn, the head of a seated individual may be thrown forward at a considerable rate and thus the potential for damage to the head is also considerable. In contrast, it will also be apparent from the above that the lower part of the rear member of the seat has relatively less energy absorbing capacity and indeed is likely to deform and/or collapse during impact, especially where an unseated individual is thrown forward.

We have provided in the above, details of the maximum energy absorbing characteristics of the three parts of the rear member of the seat. It will be apparent that the amount of energy that the rear member will need to absorb during impact will be determined by, amongst other things, the weight of the vehicle and also the rate of deceleration of same. In addition, the relative angle of the upright part of the seat with respect to the vertical will also affect the amount of energy the seat will need to absorb for a given set of impact parameters, which include weight of vehicle and deceleration. We have therefore disclosed our invention in terms of the maximum energy absorbing capacity of the upper 2 parts of the rear member, however it will be apparent that safety seats made for different weight vehicles with differing energy levels may be provided with energy absorbing materials of lower properties.

In a preferred embodiment of the invention said third lower part of said rear member is adapted so as to facilitate controlled penetration. In other words, it is adapted so as to ideally deform, and more preferably collapse, so enabling the knee area of a rearward seated individual to penetrate same on impact. We have found that a safety seat which is adapted to accommodate knee penetration minimizes damage to an individual particularly, but not exclusively, because the reduced resistance to forward movement of the knee region of an individual on impact reduces the force that the upper torso/head of the same individual makes contact with the first upper part of the rear member of the seat.

In a preferred embodiment of the invention a plurality of said seats are arranged in side-by-side manner and a cross-frame is provided between neighbouring seats which frame is adapted such that on impact it deforms forwardly ideally at or about its mid-point.

Preferably, but mutually, not exclusively, said seats are provided in pairs and thus the cross-frame between pairs of said seats deforms forwardly at a mid-point which is in the region of the innermost sides of said paired seats.

Ideally the energy absorbing materials are made of energy absorbing plastics such as polyurethane or polyethylene or any other suitable energy absorbing material that conforms with transport safety and/or fire regulations.

In yet a further preferred embodiment of the invention said safety seat is provided either with a 2-point or a 3-point seat belt or a further multi-point seat belt.

According to a further aspect of the invention there is provided a seat frame adapted to accommodate at least one and preferably two seats in side-by-side arrangement as herein described.

BRIEF DESCRIPTION OF THE DRAWINGS

An embodiment of the invention will now be described by way of example only, with reference to the following figures wherein.

FIG. 2 shows an assembled perspective view of a seat in accordance with the invention;

FIG. 3 shows a section along AA of FIG. 2;

FIG. 4 shows a section along BB of FIG. 2;

FIG. 5 shows a section along CC of FIG. 2;

FIG. 6 shows a section along DD of FIG. 2;

FIG. 7 shows a section along EE of FIG. 2; and and FIG. 8 shows a plan cross-sectional view of a seat frame in accordance with the invention.

FIG. 9A represents a diagrammatic illustration of 50%ile male dummies wherein a front dummy is 3-point belted and a rear dummy is lap-belted.

FIG. 9B represents a diagrammatic illustration of a 50%ile male dummy wherein a front seat is empty and the rear dummy is lap-belted.

FIG. 9C represents a diagrammatic illustration of 50%ile male dummies wherein a front dummy is 3-point belted and a rear dummy unbelted.

FIG. 9D represents a diagrammatic illustration of a 50%ile male dummy wherein a front seat is empty and the rear dummy is unbelted.

Table 1 represents a summary of dynamic test configurations, pulse details and injury results.

DETAILED DESCRIPTION OF THE DRAWINGS

Figure 1:
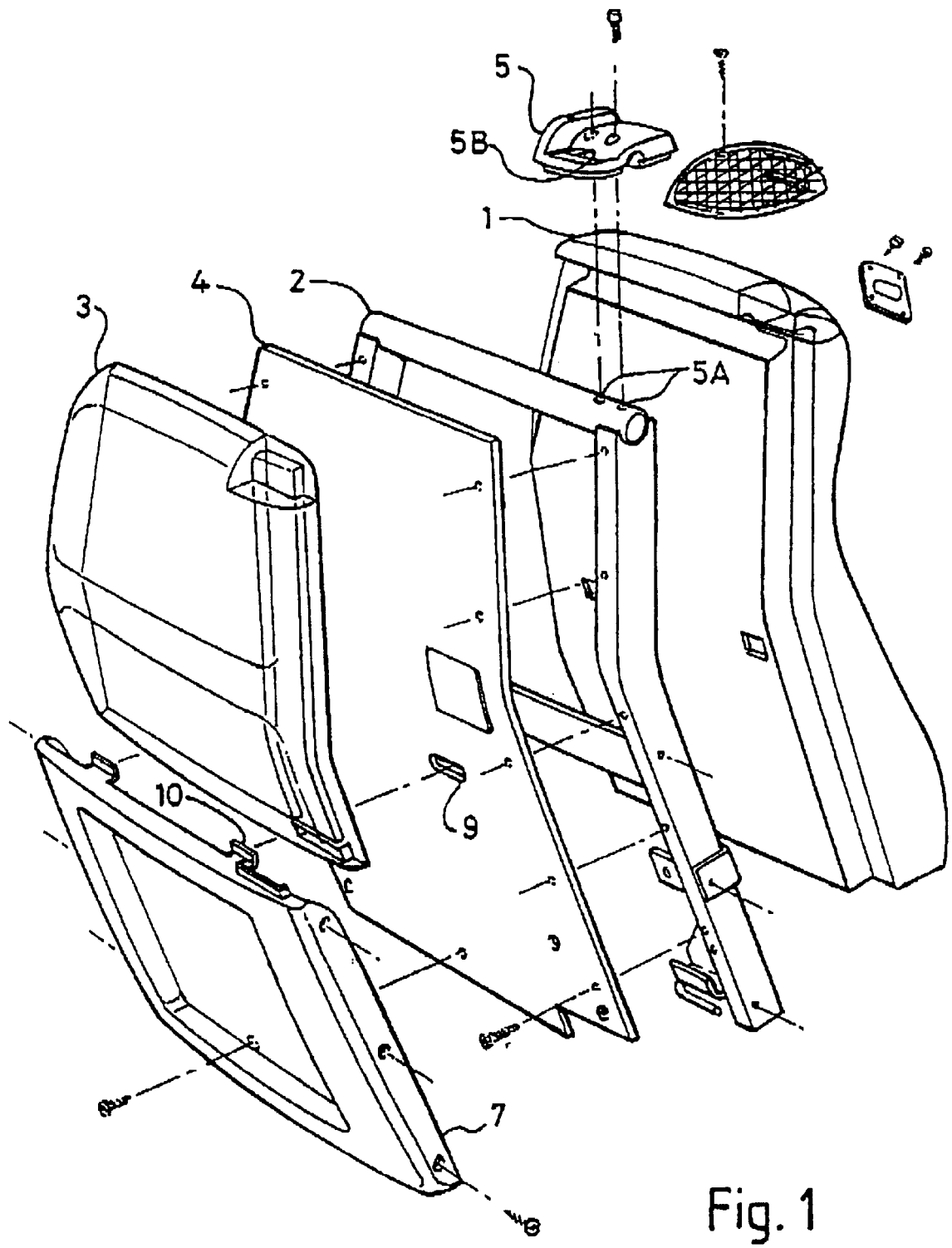
FIG. 1 shows an exploded perspective view of a vehicle seat in accordance with the invention.

Referring to the figures and firstly to FIG. 1, there is shown the rear upright part of a safety seat. The horizontal seating component and also the legs or base member of the seat are not shown but are attached to the rear upright part in conventional fashion. This attachment may include rigid or adjustable attachment means for example adjustment may be effected using a multi-adjustable rake mechanism. Conventional attachments are well known to those skilled in the art and will not be described herein in greater detail.

The rear upright part of the safety seat is shown in exploded view and comprises a minimum of 3, and ideally 4 members, that are sized and shaped so as to fit theretogether in a given predetermined order. The 3 minimal components include a foremost cushioned member 1, an inner-frame member 2 and a rearmost energy absorbing member 3. Preferably, an inner structure member 4, ideally made of plywood or the like or any other material which conforms to safety and/or fire regulations with substantially the same properties as plywood, is also provided in order to add structure and strength to the seat but also having predetermined energy absorbing characteristics as will herein after be described.

The size and shape of the seat may be fashioned according to a users requirements and will not be discussed herein in great detail, suffice as to say that the foremost member 1 must be adapted to comfortably accommodate a seated individual and the rearmost member 3 and in some instances, in combination with member 4, must be provided with the desirable energy characteristics as will be referred to herein after.

It can be seen, by reference to FIG. 1, that conventional attachment means are provided in order to fix each of the upright rear seat member parts theretogether. Accordingly, these attachment means will not be described in greater detail.

Frame member 2 is adapted to have attached thereto a restraining means such as a lap safety belt, or a 3-point safety belt. In the illustration shown in FIG. 1 frame member 2 is adapted to have a 3-point safety belt attached thereto. Thus an upper selected side member of frame 2 is provided with paired apertures 5A to which an upper seat belt guide 5 is attached.

There is shown in FIG. 2 the assembled version of the upright rear part of the safety seat. It can be seen that this rear part is of sufficient length that when it is mounted for the purpose of transportation, the lower part of same terminates below the height of the knee region of an individual seated rearward of the seat, and the upper part terminates above or at the approximate height of the head of an individual seated rearward of the safety seat.

In FIG. 3 the upper outermost side of the seat, to which a 3-point safety belt is attached, is shown in greater detail. The aperture 5B, defined in the belt guide 5, is positioned so that a safety belt passing therethrough travels upwardly through same.

In FIG. 4 there is shown a section of the mid-side region of the rear part of the seat. It can be clearly seen that foam cushioning is attached to member 4 that is the structural plywood, and a cavity 4A is provided between member 4 and rearmost member 3 through which cavity 4A a safety belt passes upwardly toward belt guide 5. Rearmost member 3 comprises a lowermost back shell 7 and upwardly thereof an energy absorbing part 8A made of a suitable energy absorbing material such as propex is provided and contained within moquette 8.

In FIG. 5 the same general arrangement is shown except in that member 4 is provided with an aperture 9 which is adapted to receive back shell 7 and more specifically it is adapted to receive an inwardly projecting hook member 10 which is either attached to back shell 7 or integral therewith. Ideally, a pair of spaced aligned apertures 9 are provided in member 4 and a pair of spaced and aligned hooks 10 are provided on back shell 7.

Towards the mid region of the rear part of the safety seat, as shown in FIG. 6, it can be seen that moquette 8 is fixedly attached to member 4, in this instance using a Velcro attachment, although other attachment means may be provided such as the use of adhesives or the like. Velcro is simply preferred because of its releasable properties. Further, moquette or recognised alternative trim material(s) 8 is held in place by virtue of the positioning of back shell 7.

In all of FIGS. 4, 5 and 6 an energy absorbing material such as propex is shown situated approximately above the mid-line of the rear upright member 3 and in a region which can be broadly represented by the dotted outline labelled X in FIG. 2.

Upwardly of region X there is provided a second region labelled Y which also includes an energy absorbing material.

It is of note that although regions X and Y have been exemplified as 2 separate discrete regions it is within the scope of the invention to provide for a single region which includes areas labelled X and Y.

In addition, the nature of the energy absorbing material in regions X and Y may be the same or may be varied and in the instance where a single region including regions X and Y is provided with energy absorbing material there may be a gradation, gradual or otherwise, in the nature of the energy absorbing material provided in this combined region.

Further characteristics of the energy absorbing regions and/or materials will be discussed in greater detail herein after.

FIG. 7 shows a cross-section of a lowermost rear end part, of a safety seat and it can be seen that member 4 is attached to a lower part of square section frame 2 and sandwiched between a first part represented by members 4 and 2 and a second part represented by back shell 7 there is provided Velcro material. The sandwiching is held in place via bolt 11.

In so far as the safety features of the seat are concerned it is apparent that the seat is provided with a restraining means and a suitable frame for the anchoring of same; and further the strength and structure of the frame is such that an individual seated and held within the restraining means is relatively restrained during collision, in other words the seat is sufficiently strong to absorb the load placed upon same when an individual is thrown forward during impact.

In addition, the rear most part of the seat can essentially be divided up into 3 functional parts, the first upper part is represented by region Y, a second middle part is represented by region X and a third lower part is represented by the structure in the vicinity of back shell 7.

Region Y is provided with an energy absorbing material having a maximum of energy absorbing capacity up to 7,000 NM and ideally up to 6,901.5 NM.

Region X is provided with an energy absorbing material having a maximum energy absorbing capacity up to 16,000 NM and ideally 15,818.8 NM.

Thus it can be seen from the above that the part of the seat which will be exposed to maximum force on impact is provided with maximum capacity in terms of energy absorption.

As previously mentioned maximum energy absorbing capacity will be required in the instance where an individual seated rearwardly of the seat is provided with a lap seat belt because in this instance a whiplash like motion will take place and the head of such an individual will be thrown forwardly at a considerable rate.

The lower most part of the seat does not comprise energy absorbing material as above described but rather comprises a back shell and inwardly of same a structural component 4 which ideally is made of plywood or some other such material but in any event is made such that the combined energy absorbing capacity of the lower part of the seat does not exceed 2,900 NM and certainly no more than 2,965 NM.

This therefore means that where an individual is thrown forward the knee region of such an individual will make contact with the lower rearmost part of the seat and because of the predetermined energy absorbing capacity of this part of the seat the part will either deform and/or collapse. We have therefore provided for controlled penetration of this part of the seat by the knee region of an individual seated rearwardly thereof.

Advantageously, we have found that the collapse of this part of a seat is desirable because it results in an individual experiencing minimum damage during impact. For example, we have found that deformation and/or collapse of this part of the seat results in the upper part of an individual being thrown forwardly to a much less extent.

In addition to the above described features we prefer to provide our safety seats in a side-by-side arrangement and ideally in pairs in such an arrangement. When provided in this fashion we typically provide underneath neighbouring seats a cross-frame arrangement and we have adapted our cross-frame arrangement so that on impact it deforms forwardly ideally about its mid-line. Thus where a cross-frame arrangement is provided underneath a pair of safety seats, during impact, the frame arrangement deforms forwardly in a region approximately mid-way between the 2 seats.

Figure 8:
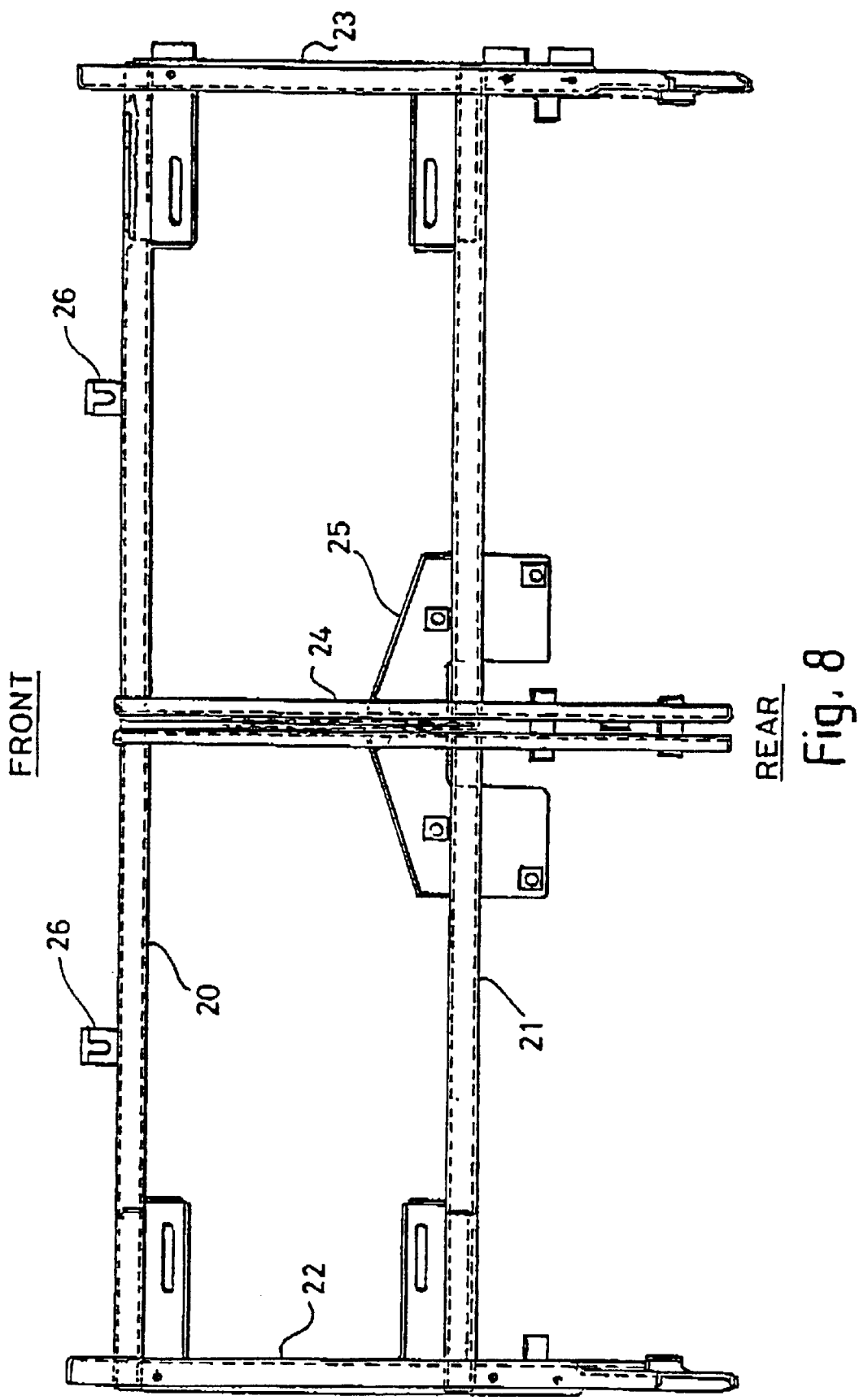

There is shown in FIG. 8 a preferred embodiment of a frame adapted to accommodate seats when provided in a side-by-side arrangement. The frame comprises 30×20×2 mm RHS to BS 6323:PT5. As shown in FIG. 8 the frame essentially comprises two halves, one towards the left-hand side of the figure and one towards the right-hand side of the figure. Each half is adapted to accommodate a seat constructed in accordance with the invention as will be described hereinafter.

The frame comprises essentially two horizontal cross-members a front and a rear cross-member 20 and 21 respectively, which members may comprise a single cross bar extending across the entire length of the frame or alternatively a plurality of cross bars such as two cross bars connected centrally.

At the outer most ends of front 20 and rear 21 cross-members are provided outer frame members 22 and 23 which extend forward and rearward of said cross-members 20 and 21. In particular, the side members 22 and 23 extend considerably rearward of rear cross-member 21 and are provided with attachment means to which seat inclination mechanisms can be attached.

A central cross-member 24 is provided between cross-members 20 and 21 and attached thereto is a seat belt attachment means 25.

Cross-members 20 and 21 are carefully selected so as to have the desirable deformation property on impact. These cross-members are made of RHS 30×20×20 mm to BS6323;PT5, or alternatively, any other material which will deform when an individual seated rearward of said frame is thrown forward on impact.

Front cross bar 20 is provided with a pair of spaced attachment members 26 to which the horizontal cushion of the seat is bolted.

Illustrative examples of supporting data, with reference to the invention hereinbefore described, will now be presented, wherein:

Dynamic tests, that is when the transportation mode crashes into a solid surface/wall, were carried out on a HyGe reverse accelerator sled rig, with test conditions adjusted to be as severe as possible for M3 vehicles (a vehicle with more than 8 seats plus driver, weighing more than 5 tonnes). Seats as hereinbefore described and according to the invention were mounted on rails identical to those used in standard reference coaches.

All tests (except Test 4 which involved seat rows 1 and 2 only) examined two scenarios presented in diagrammatic illustrations 9A–9D, in which the first scenario 9A and 9B depict rear dummies that are lap-belted and the second scenario, 9C and 9D, depict rear dummies that are unbelted. Tests employed the single firing of a HyGe sled rig, the test arrangement was:

Row 1: tested seat—seat, according to the present invention, in Tests 1 to 4, loaded with un-instrumented, 3-point belted Hybrid II dummies, Row 2: launch seat—R80 seat in all tests, loaded with instrumented Hybrid II (window seat) and Hybrid III (aisle seat) dummies (50%ile in tests); dummies were unbelted in Tests 1 and lap-belted in Tests 2–4, Row 3: tested seat—empty in all tests, Row 4: launch seat—standard R80 seats in all tests, with instrumented Hybrid II (window) and 50%ile Hybrid III dummies unbelted in Test 3, otherwise lap-belted.

The "pitch" (i.e. seat spacing) between the test and launch seats was 750 mm in all cases. The gap between the seat back in row 2 and cushion in row 3 was approximately 150 mm, so that there was no inter-action between the seats in rows 2 and 3.

The reference injury criteria required by the ECE Regulation 80 and the new draft amendments to the 76/115/EEC Directive were:

(a) the head injury/acceptance criterion (HAC): 500

(b) the chest (thorax) acceleration acceptance criterion (ThAC): 30 g for up to 3 ms (c) the femur force acceptance criterion (FAC): 10 kN (8 kN for more than 20 ms.)

Although not part of any safety legislation, the neck injury criteria in most Hybrid III dummies were also measured to investigate an important injury mechanism. These are based on the comparison of the processed time histories (level-duration) of the neck loads with a "tolerance corridor" and expressed in percents of the tolerance limit. An "acceptable" result reads less than 100%.

Test 1 and all subsequent tests had an identical main structure. The seat met all the structural, dummy kinematics and injury criteria, including the extra neck-related data, with the exception of the unbelted Hybrid II dummy in the second row whose HAC was just above the limit (567 c.f 500). Please refer to Table 1. There was no damage to anchorages and all seats stayed firmly anchored after test. This demonstrated that the same seat can carry 3-point belted occupants and also restrain the unbelted passengers behind. When empty, it also protects the rear lap-belted passengers.

Test 2 included some improvement of the head strike region and met all the structural, dummy kinematics and injury criteria (Table 1) for the unbelted occupants sitting behind the empty seat. The fore and aft neck criterion was, however, marginally above the limit (110%). The head strike region had to be improved again also because both lap belted dummies in the second row failed the HAC (871 and 633), but passed other requirements.

Test 3 confirmed that the worst case scenario (at least with this particular seat) when the seat loaded with 3-point belted passengers also had to protect lap-belted occupants behind.

Test 4 showed (Table 1) full compliance with all the injury criteria in the last remaining case of the seat protecting both the 3-point belted 50%ile dummies and simultaneously, the lap-belted 50%ile dummies behind.

Static Test on Belt Anchorages to the 76/115/EEC Directive

The static test (where the transportation mode remains static and an object is made to crash into it) the seat belt anchorages to the Directive 76/115/EEC, as amended in 90.626/EEC was carried out on one seat after completion of the dynamic tests. The M3 specification required 450 daN for each torso belt and for each lap belt 450 daN plus 6.6 times to half of the seat weight (i.e. a total of 567 daN). The test requirement was met with the seat top moving forward to a maximum of approximately 200 mm and without any material separation.

Thus we have provided and proven a safety seat and frame which is adapted to accommodate maximum load which load is provided when an individual seated therein is thrown forwardly within a restraining means and when an individual seated rearwardly thereof is thrown against same.

TABLE 1

Summary of all the Dynamic Test Configuration, Pulse Details and Injury Results

| Seats | Seat Spacing | Test 1 | Test 2 | Test 3 | Test 4 |
|---|---|---|---|---|---|
| 1st | All seat spacing 750 mm | new | new | new | new |
| 2nd | and all seats in Test 7 (650 mm) | R80 | R80 | R80 | R80 |
| 3rd |  | new | new | new | not used |
| 4th |  | R80 | R80 | R80 | not used |
| Dummies |  |  |  |  |  |
| 1st | All dummies Hybrid II (50%ile male | 3-point belted | 3-point belted | 3-point belted | 3point belted |
| 2nd | window: Hybrid II (50%ile) aisle Hybrid III (50%ile) | Un-belted | Lap belted | Lap belted | Lap belted |
| 3rd |  | Empty | Empty | Empty | Not used |
| 4th | Hybrid II in window seats for other tests | Lap belted | Un-belted | Lap belted | Not used |
| Dummy Parameters |  |  |  |  |  |
| Second Row Window | Head HAC | 567 | 871 | 697 | 413 |
|  | Chest 3 ms max (g) | 21.2 | 22.6 | 24.9 | 21.6 |
|  | Maximum Left Femur Load (kN) (compression + ve) | 5.1 | 3.6 | 3.4 | 4.0 |
|  | Maximum Right Femur Load (kN) (compression + ve) | 2.9 | 0.7 | 0.4 | 1.0 |
| Second row Aisle | Head HAC | 302 | 633 | 604 | 439 |
|  | Fore/Aft Neck Criterion (%) |  | 39.9/ 24.3 | 14.6/ 76.7 | 59.3/ 11.9 |
|  | Tension/Compression Neck Criterion (%) |  | 56.3/ 5.3 | 54.7/ 5.1 | 79.4/ 57.5 |
|  | Chest 3 ms max (g) | 12.3 | 14.1 | 12.8 | 12.6 |
|  | Maximum Left Femur Load (kN) (compression + ve) | 4.3 | 2.8 | 2.7 | 2.8 |
|  | Maximum Right Femur Load (kN) (compression + ve) | 3.4 | 2.5 | 2.3 | 2.8 |
| Rear Row Window | Head HAC | 436 | 213 | 347 |  |
|  | Chest 3 ms max (g) | 29.8 | 29.2 | 24.5 |  |
|  | Maximum Left Femur Load (kN) (compression + ve) | 3.7 | 4.5 | 4.1 |  |
|  | Maximum Right Femur Load (kN) (compression + ve) | 3.3 | 3.8 | 2.6 |  |
| Rear Row Aisle | Head HAC | 356 | 359 | 575 |  |
|  | Fore/Aft Neck Criterion (%) | 15.4/ 65.9 | 10.4/ 110 | 12.1/ 86.8 |  |
|  | Tension/Compression Neck Criterion (%) | 95.1/ 27 | 91.8/ 9.6 | 71.6/ 4.6 |  |
|  | Chest 3 ms max (g) | 19 | 21.2 | 15.5 |  |
|  | Chest Deflection (mm) |  | 3.7 |  |  |
|  | Maximum Left Femur Load (kN) (compression + ve) | 3.4 | 4.7 | 4.9 |  |
|  | Maximum Right Femur Load (kN) (compression + ve) | 4.0 | 3.7 | 3.5 |  |
| Pulse | Maximum Deceleration | 11.9 | 12.0 | 11.9 | 11.2 |
| Details (g) | Maximum Velocity (kph) | 29.9 | 29.9 | 29.9 | 30.6 |
|  | Average Deceleration (g) | 7.73 | 7.69 | 7.16 | 7.19 |

We claim:

1. A safety seat for use in a transport compartment comprising a seat frame (2) adapted to have a restraining means attached thereto; a front member (1) also attached to said frame (2) and adapted for a user's comfort; and a rear member (3) also attached to said frame (2) and further divided into at least three further parts; an upper part (Region Y) including an energy absorbing structure which is adapted to absorb up to 7,000 NM of energy during impact; a middle part (Region X) including an energy absorbing structure adapted to absorb up to 16,000 NM of energy during impact and; a lower part (7) including an energy absorbing structure adapted to absorb no more than 2,900 NM of energy during impact, in turn, minimizing the forces resulting from the impact on the upper and middle parts.

2. A safety seat according to claim 1 wherein said upper part (Region Y) absorbs up to 6,901.5 NM of energy.

3. A safety seat according to claim 1 wherein said middle part (Region X) absorbs up to 15,818.8 NM.

4. A safety seat according to claim 1 wherein said lower part (7) absorbs no more than 2,975.3 NM.

5. A safety seat according to claim 1 wherein said lower part (7) of said rear member includes means for facilitating controlled penetration thereof during impact by an individual seated rearward thereof.

6. A safety seat according to claim 1 wherein the safety seat is one of a plurality of safety seats, the plurality of said seats being arranged in side by side manner wherein a cross-frame (20–26) is provided between neighboring seats.

7. A safety seat according to claim 6 wherein said cross-frame (20–26) is adapted such that on impact it deforms forwardly.

8. A safety seat according to claim 1 wherein said seat is one of a pair of safety seats, wherein the paired seats include innermost sides, and a cross-frame (20–26) is positioned between pairs of said seats and deforms forwardly at a mid-point (24) which is in a region of the innermost sides of said paired seats.

9. A safety seat according to claim 1 wherein said seat is constructed of energy absorbing plastics material.

10. A safety seat according to claim 1 wherein said seat is provided either with a 2 point or 3 point seat belt.

11. A safety seat according to claim 1 wherein said seat is provided with a seat frame adapted to accommodate at least two seats in a side by side arrangement.

* * * * *